United States Patent [19]

Stessens et al.

[11] Patent Number: 5,581,557
[45] Date of Patent: Dec. 3, 1996

[54] METHOD USED IN A COMMUNICATION NETWORK FOR DETERMINING ACCESS OF USER STATIONS TO A MAIN STATION THEREOF

[75] Inventors: Werner J. C. Stessens, Mol; Jan L. B. De Groote, Berchem; Gert Van der Plas, Merchtem; Willem J. A. Verbiest, Sint Gillis Waas; Vincent Pirson, Tervuren, all of Belgium

[73] Assignee: Alcatel N.V., Rijswijk, Netherlands

[21] Appl. No.: 386,936

[22] Filed: Feb. 10, 1995

[51] Int. Cl.$^6$ .................................................. H04J 3/00
[52] U.S. Cl. ....................................................... 370/431
[58] Field of Search .............................. 370/85.1, 85.6, 370/85.2, 95.3

[56] References Cited

U.S. PATENT DOCUMENTS

| | | | |
|---|---|---|---|
| 5,265,223 | 11/1993 | Brockmann et al. | 395/325 |
| 5,434,984 | 7/1995 | Deloddere et al. | 370/85.6 |

FOREIGN PATENT DOCUMENTS

| | | |
|---|---|---|
| 0080232 | 6/1983 | European Pat. Off. . |
| 0190501 | 8/1986 | European Pat. Off. . |
| 0521197 | 1/1993 | European Pat. Off. . |
| 8404638 | 11/1984 | WIPO . |

OTHER PUBLICATIONS

"Local distribution in computer communications", by J. F. Hayes, pub. IEEE Communications Magazine, Mar. 1991, pp. 6–14.

*Primary Examiner*—Douglas W. Olms
*Assistant Examiner*—Min Jung
*Attorney, Agent, or Firm*—Ware, Fressola, Van Der Sluys & Adolphson

[57] ABSTRACT

A method is provided of determining access in a communication network having a main station (CS) and user stations (US1–USM) with distinct N-bit binary addresses, and having an access protocol including transmitting from the main station (CS) an invitation-to-send signal, and upon receipt thereof by the user stations (US1–USM), starting an access group which includes all user stations (US1–USM) wanting access to the main station (CS).

5 Claims, 1 Drawing Sheet

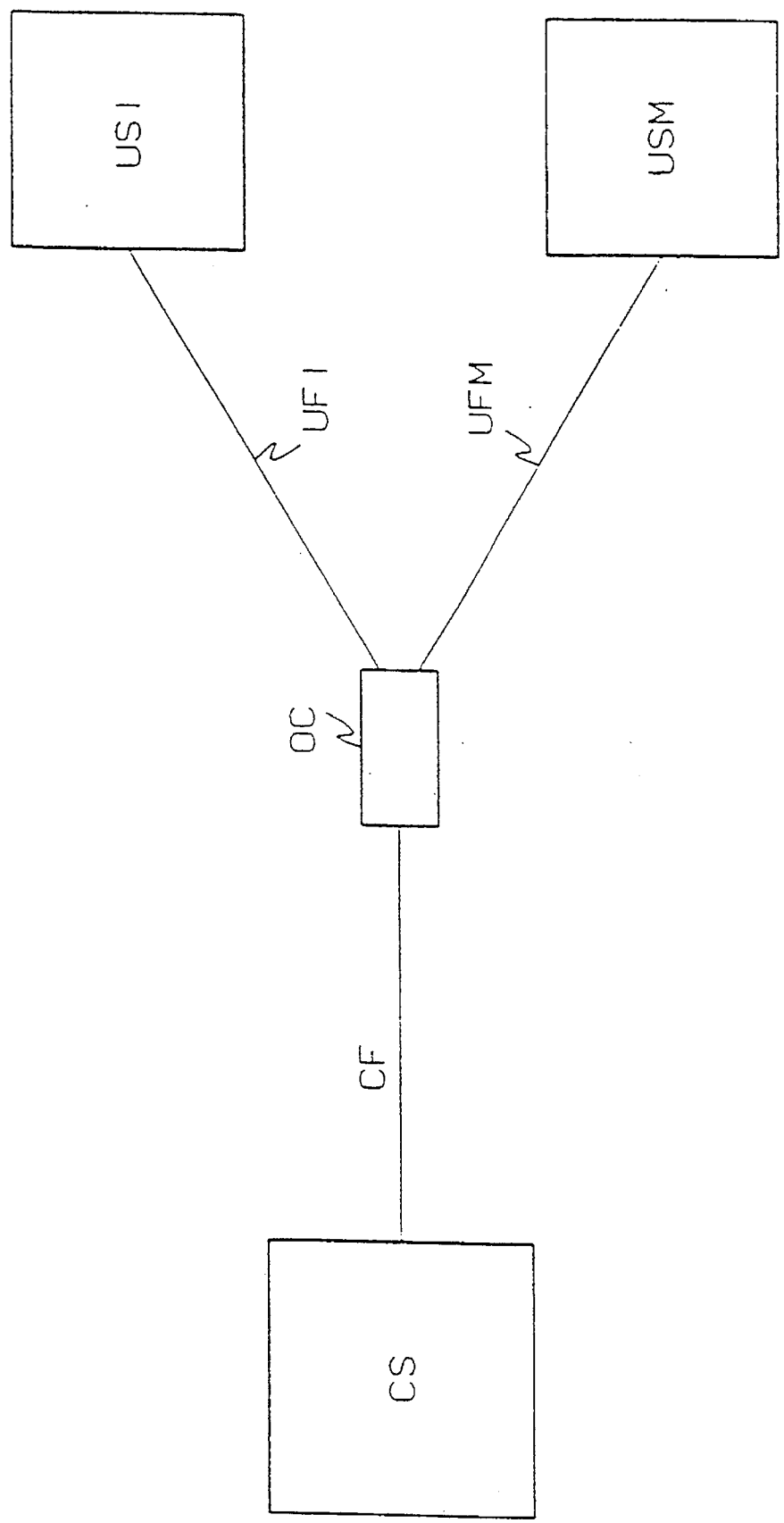

METHOD USED IN A COMMUNICATION NETWORK FOR DETERMINING ACCESS OF USER STATIONS TO A MAIN STATION THEREOF

TECHNICAL FIELD

The present invention relates to an access protocol for a communication network including a main station and a plurality of user stations having distinct N-bit binary addresses, said protocol including the steps of transmitting from said main station to said user stations an invitation-to-send signal, and upon receipt of said invitation-to-send signal by said user stations, starting with an access group which includes all user stations wanting access to said main station, and for each of the N bits of said binary addresses performing the following substeps:

transmitting from each user station of said access group an access request signal to said main station;

transmitting from said main station to said user stations a control signal allowing to determination of which user stations of said access group are to be excluded from said access group.

BACKGROUND OF THE INVENTION

Such an access protocol is already known in the art, e.g. from the article 'Local distribution in computer communications', by J. F. Hayes, published in IEEE Communications Magazine, March 1981, pp. 6–14, more specifically p. 11 thereof where it is called probing. The idea of probing is to poll for user stations having to transmit messages, i.e. wanting access to the main station, and to poll these user stations in a group rather than one at a time. In successive steps the number of user stations in this group is reduced until a single access wanting user station is possibly found, .this station being then allowed to transmit its message. Thereafter a new probing operation is started. The access request signal transmitted by each of the user stations of the access group is a noise signal indicating that it wants access to the main station. Upon receipt of this signal the main station reduces the number of user stations in the access group by means of the control signal. If no noise signal is received a new access group is probed. Thus, it is clear that after each access group reducing step it may happen that no access wanting user station remains in the new, reduced, access group, in which case the former, original, access group is to be reduced to another access group.

SUMMARY OF THE INVENTION

An object of the present invention is to provide an access protocol of the above known type but wherein a reduced access group is so chosen that at least one access wanting user station remains therein.

According to the invention, this object is achieved due to the fact that said access request signal has a power level which is a function of the value of the respective bit of said user station binary address, that said control signal indicates whether the combined power level of said access request signals transmitted by the user stations of said access group and received by said main station has a lower or higher value, and that each access wanting user station transmitting an access request signal whose power level has a higher or lower value whilst said combined power level has a lower or higher value, respectively, as indicated by said control signal, is excluded from said access group which finally includes a single said user station.

In this way, the reduced access group is never empty. Indeed, when the control signal indicates that the combined power level has the higher value, then at least one of the access wanting user stations must have transmitted an access request signal with a higher power level and thus, at least this user station remains in the reduced access group. Similarly, when the control signal indicates that the combined power level has a lower value, then all the access wanting user stations of the access group have transmitted an access request signal with a lower power level and all these user stations therefore remain in the reduced access group.

Another characteristic feature of the present invention is that said single user station is allowed to transmit data having a useful frequency spectrum, and that said access request signal is a carrier signal whose frequency lies outside said useful frequency spectrum.

Thereby, the access request signals can be easily distinguished from the data signals by filtering, i.e. no interference of the access request signals with the data signals occurs. It should be noted that the carrier signal frequency lying outside the useful frequency spectrum of the data signal merely indicates that the data signal frequency spectrum component at the carrier frequency is low enough to avoid suppression of this component to distort the data signal too much to be able to be detected by the main station.

A further feature of the present invention is that said substep of transmitting said access request signal includes:

giving said power level a first value;

comparing in said main station said combined power level with a predetermined threshold and issuing an evaluation signal indicating whether said combined power level is higher or lower than said predetermined threshold;

transmitting said evaluation signal from said main station to said user stations;

in each user station of said access group:

when said combined power level is higher than said predetermined threshold as indicated by said evaluation signal, decreasing or not the power level of said access request signal when said function of said respective bit value is low or high, respectively;

when said combined power level is lower than said predetermined threshold as indicated by said evaluation signal, increasing or not the power level of said access request signal when said function of said respective bit value is high or low, respectively.

In this way, the power level of an access request signal transmitted by a user station is adjusted so as to make sure that a higher power level thereof gives rise to a combined power level which is higher than the threshold, and that a lower power level thereof is low enough not to give rise to a combined power level which is higher than the threshold when this access request signal is combined with lower power level access request signals of other user stations. Indeed, as long as the combined power level is higher than the threshold, the power of a lower power level access request signal is decreased, whereby, when all access request signals are lower power level access request signals, the combined power level finally drops below the threshold. However, when the combined power level drops below the threshold and at least one of the access request signals has a higher power level, this power level increases so that finally the combined power level exceeds the threshold.

It should be noted that depending on the mentioned function of the value of the address bits, a higher power level of the access request signal may correspond to a binary 1 or 0.

Still other features of the present invention are that when said combined power level is higher than said predetermined threshold as indicated by said evaluation signal and when said function of said respective bit value is high, said power level of said access request signal is kept substantially constant, and that when said combined power level is lower than said predetermined threshold as indicated by said evaluation signal and when said function of said respective bit value is low, said power level of said access request signal is decreased.

Thereby, power consumption is minimized.

BRIEF DESCRIPTION OF THE DRAWINGS

The above mentioned and other objects and features of the invention will become more apparent and the invention itself will be best understood by referring to the following description of an embodiment taken in conjunction with the accompanying drawing which represents a communication network in which an access protocol according to the invention is used.

BEST MODE FOR CARRYING OUT THE INVENTION

The communication network shown includes a main station or line termination CS coupled to a plurality of M user stations or network terminations US1 to USM via a common optical fiber link CF, a passive optical coupler OC and respective individual user optical fiber links UF1 to UFM.

This communication network is a so-called passive optical network (PON) but may be any other kind of communication network, e.g. a mobile communication network with a satellite main station and a number of earthly user stations, or with a fixed main station and a number of mobile user stations.

Each of the main and user stations is equipped with a transceiver device and the main station further includes a power level evaluation circuit to compare the power level of incoming signals with a predetermined power level threshold. Further, each of the user stations US1 to USM is identified by a N-bit binary address, where M=log$_2$N, e.g. a 4 bit binary address for 16 user stations.

Digital data is transmitted downstream from the main station CS to the user stations US1 to USM at a bit rate equal to 622 Mbit/sec in an Asynchronous Transfer Mode (ATM) based Time Division Multiplexing (TDM) structure, i.e. the data is transmitted in time slots of the TDM structure and has an ATM format. Digital data is transmitted upstream from the user stations US1 to USM to the main station CS at a bit rate equal to 155 Mbit/sec according to an ATM based Time Division Multiple Access (TDMA) structure and is coded in a nonreturn-to-zero (NRZ) transmission code well known in the art. Since the upstream digital data is transmitted according to a NRZ code, it has frequency spectrum of a sinc function (sinc(f/f$_0$) wherein f$_0$ is the frequency, i.e. the bit rate, at which the data is transmitted), this frequency spectrum having no component at this frequency f$_0$, i.e. at 155 MHz.

A user station which has to transmit a message to the main station CS first has to send to CS an access request signal to request the grant of a free time slot of the TDMA structure in which it can then transmit its message. To this end and to eliminate collision between user stations simultaneously sending such access request signals, the following access protocol is used between the user stations US1 to USM and the main station CS.

When no such access protocol is being performed, i.e. when none of the user stations is sending access request signals in order to gain access to the main station CS, and preliminary to such access protocol the latter station CS broadcasts invitation-to-send signals to all the user stations on a regular basis. Each user station wanting access to the main station CS waits for the receipt of such an invitation-to-send signal to start the access protocol. More particularly, upon receipt of such an invitation-to-send signal it starts transmitting an access request signal constituted by a carrier signal having the above frequency f$_0$ of 155 MHz. As the frequency f$_0$ is not included in the frequency spectrum of digital data possibly transmitted from other user stations to the main station CS, this access request signal cannot disturb these digital data signals on the common link CF and can be easily separated in the main station CS.

It should be noted that in order to avoid access request signals from different user stations to cancelling one another when they are in perfect phase opposition, a small phase jitter may be introduced on the carrier signal.

The one or more access request signals thus transmitted by the user stations are combined in the coupler OC and the thus obtained combined access request signal is received by the main station CS where its power level is evaluated, i.e. compared with the above predetermined power threshold level.

At regular time intervals, for instance every millisecond, the power level of each of the access request signals is increased from a minimum first level onwards. When the combined access request signal received at the main station CS exceeds the above threshold, the latter main station CS broadcasts a stop-increase signal to the user stations. Upon receipt of this signal the latter stations stop increasing the power level of the access request signal.

Each of the user stations of an access group, which at the start includes all user stations wanting access to the main station CS, then starts modifying the request signal for sending the first bit of its binary address. When this first bit is a binary 0, the user station decreases power level of its access request signal, whereas when this bit is a binary 1, it increases this power level. At regular second time intervals, not necessarily equal to the above first mentioned time intervals but which for instance occur at the same frequency, the main station then checks whether the combined power level of the received access request signals is higher or lower than the above threshold, whereupon it broadcasts to each of the user stations an evaluation signal which is a stop-increase signal when the combined power level is higher than the threshold, and a do-increase signal when this power level is lower than the threshold.

Upon receipt of such a stop-increase signal a user station having to transmit a binary 0 further decreases the power level of its access request signal, whereas when it has to transmit a binary 1 it keeps this power level substantially constant. On the contrary, upon receipt of such a do-increase signal a user station having to transmit a binary 0 also decreases the power level of its access request signal, whereas when it has to transmit a binary 1 it increases this power level. As a consequence, when none of the user stations of the access group has to transmit a binary 1, the power level of each access request signal is decreased to such extent that the combined power level of the received access request signals finally drops below the above threshold. On the other hand, when one or more of the user stations of the access group has to transmit a binary 1, the combined power level finally exceeds the above threshold. Indeed, as long as this is not so, the main station CS transmits do-increase signals which cause each of the user stations having to transmit a binary 1 to increase the power level of its access request signal until the combined power level exceeds the threshold.

At regular third time intervals, larger than the above second time intervals and for instance equal to 100 msec, the main station CS checks whether the combined power level of the received access request signals is lower or higher than the above threshold and subsequently transmits a control signal, indicative either of a 1-detection when the combined power level exceeds the threshold, or of a 0-detection when the combined power level is lower than this threshold.

It should be noted that the duration of the third time interval is so chosen that the combined power level is finally lower or higher than the above threshold when none or at least one of the user stations of the access group has to transmit a binary 1, respectively.

Upon receipt of a control signal indicative of a 1-detection, a user station having transmitted a binary 0, stops the access protocol, i.e. it inhibits transmission of a further bit of its binary address, and thus excludes itself from the access group, whereas a user station having transmitted a binary 1, continues the access protocol, i.e. it starts transmitting a further bit of its binary address. Upon receipt of a control signal indicative of a 0-detection a user station having transmitted a binary 0, transmits a further bit of its binary address. Finally, a user station having received a control signal indicative of a 0-detection whilst it has just transmitted a binary 1 finds itself in an error situation and stops transmission of further bits.

It should be noted that this error situation may for instance be caused by a failing transmitter in the user station or by temporarily deteriorated propagation conditions of the access request signal through the individual user links and the common link. In the user station appropriate actions may be taken to determine the source of the error.

When no error situation occurs, the respective address bits of the user stations which after each step remain in the running, i.e. which still belong to the access group are consecutively transmitted to the main station CS in the above way by means of access request signals. After each step one or more user station remain in the access group, viz. the user stations having transmitted a binary 1 in that step or all the user stations already belonging to the access group before that step when they all transmitted a binary 0. Furthermore, when all the address bits of the user stations of the access group have been transmitted and supposing of course that all the binary addresses are different, only a single user station finally remains in the access group. Thereupon the main station CS allocates to the user station a time slot in the TDMA structure within which it can transmit its message. Indeed, after each step only user stations whose address bits up to then have been the same remain in the access group, so that finally a single user station remains in the access group. For instance, when the access group initially consists of two user stations having respective binary addresses 0100 and 0110, then after the transmission of the second bit they are both still included in the access group but after the third bit has been transmitted only the second of the two remains in the access group.

It should be noted that with the above described access protocol and supposing the first sent bit is the least significant bit, the user station gaining access to the main station CS is the one of the initial access group whose binary address read from least to most significant bit is the highest. Thus, when the first bit, sent is the most significant bit the user station of the access group having the largest binary address will gain access to the main station CS. Furthermore, when in the above protocol the power level adaptations of the carrier signal for binary ones and zeros are interchanged, the user station of the access group with the smallest binary address, read from least to most significant bit or vice versa, gains access to the main station CS. In this way a priority assignment exists between the various user stations for gaining access to the main station CS. Furthermore, in order to change this priority assignment one could require a predetermined function to be performed on the address before transmitting the bits.

While the principles of the invention have been described above in connection with specific apparatus, it is to be clearly understood that this description is made only by way of example and not as a limitation on the scope of the invention.

What is claimed is:

1. A method of determining access to a communication network including a main station (CS) and a plurality of user stations (US1, . . . , USM) having distinct N-bit binary addresses, said method having an access protocol including the steps of transmitting from said main station (CS) to said user stations (US1, . . . , USM) an invitation-to-send signal, and upon receipt of said invitation-to-send signal by said user stations (US1, . . . , USM), starting with an access group which includes all user stations (US1, . . . , USM) wanting access to said main station (CS), and for each of the N bits of said distinct N-bit binary addresses performing the following substeps:

transmitting from each user station (US1, . . . , USM) of said access group an access request signal to said main station (CS);

transmitting from said main station (CS) to said user stations (US1, . . . , USM) a control signal allowing the determination of which of said user stations (US1, . . . , USM) of said access group are to be excluded from said access group, characterized in that the method further comprises the steps of:

providing said access request signal with a power level which is a function of a value of a respective bit of a distinct N-bit binary address of said user station (US1, . . . , USM), indicating with said control signal whether a combined power level of combined access request signals transmitted by the user stations (US1, . . . , USM) of said access group and received by said main station (CS) has a low power value representing a receipt of all logical "0" values or a high power value representing a receipt of at least one logical "1" value, and excluding from said access group each user station (US1, . . . , USM) wanting access to said main station (CS) that transmits a respective access request signal a respective power level that either has a respective higher power value if said combined power level has the lower power value as indicated by said control signal, or has a respective lower power value if said combined power level has the higher power value as indicated by said control signal, repeating the steps of providing, indicating and excluding until said access group includes a single user station (US1, . . . , USM) to be provided access to said main station (CS).

2. A method of determining access according to claim 1, characterized in that the method further comprises the step of allowing said single user station to transmit data having a useful frequency spectrum, and providing said access request signal as a carrier signal having a frequency that lies outside said useful frequency spectrum.

3. A method of determining access according to claim 1, characterized in that said substep of transmitting said access request signal further comprises:

giving said power level a first value;

comparing in said main station said combined power level with a predetermined threshold and issuing an evaluation signal indicating whether said combined power level is higher or lower than said predetermined threshold;

transmitting said evaluation signal from said main station to said user stations;

in each user station of said access group:

when said combined power level is higher than said predetermined threshold as indicated by said evaluation signal, decreasing the power level of said access request signal when said function of said respective bit value is low;

when said combined power level is lower than said predetermined threshold as indicated by said evaluation signal, increasing the power level of said access request signal when said function of said respective bit value is high.

4. A method of determining access according to claim 3, characterized in that the method further comprises the step of:

keeping substantially constant said power level of said access request signal when said combined power level is higher than said predetermined threshold as indicated by said evaluation signal and when said function of said respective bit value is high.

5. A method of determining access according to claim 3, characterized in that the method further comprises the step of:

decreasing said power level of said access request signal when said combined power level is lower than said predetermined threshold as indicated by said evaluation signal and when said function of said respective bit value is low.

* * * * *

UNITED STATES PATENT AND TRADEMARK OFFICE
CERTIFICATE OF CORRECTION

PATENT NO. : 5,581,557
DATED : December 3, 1996
INVENTOR(S) : Stessens, et. al.

It is certified that error appears in the above-indentified patent and that said Letters Patent is hereby corrected as shown below:

Title page, item [30] insert==Foreign Application Priority Data, February 11, 1994 [EP] European Pat. Off. 94200361.7--.

Signed and Sealed this

First Day of July, 1997

Attest:

BRUCE LEHMAN

Attesting Officer

Commissioner of Patents and Trademarks